(12) United States Patent  (10) Patent No.: US 9,256,051 B2
Ahn et al.  (45) Date of Patent: Feb. 9, 2016

(54) PHOTOGRAPHIC LENS OPTICAL SYSTEM (71) Applicant: KOLEN CO., LTD, Seongnam-si (KR)

(72) Inventors: Chi Ho Ahn, Seongnam-si (KR);
Kyoung Soo Song, Seongnam-si (KR);
Ji Eun Kim, Seongnam-si (KR); Chan Goo Kang, Seongnam-si (KR); Seong Hee Bae, Daejeon (KR)

(73) Assignee: KOLEN CO., LTD (KR)

( * ) Notice: Subject to any disclaimer, the term of this patent is extended or adjusted under 35 U.S.C. 154(b) by 0 days.

(21) Appl. No.: 14/567,651

(22) Filed: Dec. 11, 2014

(65) Prior Publication Data

US 2015/0177486 A1 Jun. 25, 2015

(30) Foreign Application Priority Data

Dec. 24, 2013 (KR) .................. 10-2013-0162910

(51) Int. Cl.
*G02B 9/34* (2006.01)
*G02B 13/04* (2006.01)
*G02B 13/18* (2006.01)
*G02B 13/00* (2006.01)
*G03B 13/32* (2006.01)

(52) U.S. Cl.
CPC ............. *G02B 13/004* (2013.01); *G02B 9/34* (2013.01); *G03B 13/32* (2013.01)

(58) Field of Classification Search
CPC ........ G02B 13/004; G02B 9/34; G02B 13/18; G02B 13/04
USPC .................................. 359/715, 771, 781, 753
See application file for complete search history.

(56) References Cited

U.S. PATENT DOCUMENTS

| 4,400,063 A | * | 8/1983 | Hayashida | ............... G02B 9/34 359/206.1 |
| 2010/0103537 A1 | * | 4/2010 | Kitahara | ............... G02B 9/60 359/784 |
| 2011/0080655 A1 | * | 4/2011 | Mori | ............... G02B 9/34 359/715 |
| 2011/0090575 A1 | * | 4/2011 | Mori | ............... G02B 13/24 359/717 |

FOREIGN PATENT DOCUMENTS

JP 2013007968 A 1/2013

OTHER PUBLICATIONS

Korean Intellectual Property Office Notice of Allowance Application No. 10-2013-0162910 Date: May 1, 2015 pp. 3.

* cited by examiner

*Primary Examiner* — Scott J Sugarman
(74) *Attorney, Agent, or Firm* — St. Onge Steward Johnston & Reens, LLC

(57) ABSTRACT

A photographic lens optical system includes: a first lens having a negative refractive power and a meniscus shape convex toward an object side; a second lens having a positive refractive power and a shape convex toward an image side; a third lens having a positive refractive power and a double convex shape; and a fourth lens having a negative refractive power and a shape convex toward the image side, wherein the first to fourth lenses are sequentially arranged in a direction from the object side to the image side, and the photographic lens optical system satisfies the following condition:

$0.15 < |(\tan \theta)/f| < 0.25$ where $\theta$ and $f$ denote an angle of view and a focal length of the photographic lens optical system, respectively.

13 Claims, 6 Drawing Sheets

PHOTOGRAPHIC LENS OPTICAL SYSTEM

FIELD OF THE INVENTION

One or more embodiments of the present invention relate to an optical device, and more particularly, to a photographic lens optical system for cameras of vehicles.

BACKGROUND OF THE INVENTION

Recently, the use of cameras including solid-state imaging devices such as charge coupled devices (CCDs) or complimentary metal oxide semiconductor (CMOS) image sensors has greatly increased.

Also, the degree of pixel integration in solid-state imaging devices has been increased to improve the resolution of cameras. Along with this, small and lightweight cameras have been developed by improving the performance of lens optical systems included in the cameras.

In general, the use of more lenses in a lens optical system may be effective in guaranteeing high optical performance such as a wide angle of view, a high magnification, and correction of aberrations. However, if a lens optical system includes many lenses, providing small, lightweight, and inexpensive cameras may not be possible. On the other hand, if the number of lenses included in a lens optical system is decreased, aberrations may not be sufficiently corrected even though such a lens optical system may be effective in terms of product size and price competitiveness.

Therefore, it is necessary to design lens optical systems that have appropriate optical performance and are also effective in obtaining cameras with reduced size, weight, and costs.

SUMMARY OF THE INVENTION

One or more embodiments of the present invention include a lens optical system effective for size/weight reduction of a camera and having a wide angle of view and a high performance.

Additional aspects will be set forth in part in the description which follows and, in part, will be apparent from the description, or may be learned by practice of the presented embodiments.

According to one or more embodiments of the present invention, a photographic lens optical system includes: a first lens having a negative refractive power and a meniscus shape convex toward an object side; a second lens having a positive refractive power and a shape convex toward an image side; a third lens having a positive refractive power and a double convex shape; and a fourth lens having a negative refractive power and a shape convex toward the image side, wherein the first to fourth lenses are sequentially arranged in a direction from the object side to the image side, and the photographic lens optical system satisfies the following condition:

$$0.15 < |(\tan \theta)/f| < 0.25$$

where θ and f denote an angle of view and a focal length of the photographic lens optical system, respectively.

The photographic lens optical system may satisfy the following condition:

$$1.3 < r2/f < 1.5$$

where r2 denotes a radius of curvature of an image-side surface of the first lens, and f denotes a focal length of the photographic lens optical system.

At least one of the first lens, the second lens, the third lens, and the fourth lens may have at least one aspheric surface.

The first lens, the second lens, the third lens, and the fourth lens may be formed of glass or a plastic material.

The photographic lens optical system may further include an aperture stop and satisfy the following condition:

$$0.9 < d4/f < 1.0$$

where d4 denotes a distance between an image-side surface of the second lens and the aperture stop.

The aperture stop may be disposed between the second lens and the third lens.

According to one or more embodiments of the present invention, a photographing apparatus includes: the photographic lens optical system; and an image sensor converting an optical image formed by the photographic lens optical system into an electric signal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE INVENTION

Reference will now be made in detail to embodiments, examples of which are illustrated in the accompanying drawings, wherein like reference numerals refer to like elements throughout and the size of each element may be exaggerated for clarity of illustration. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1:
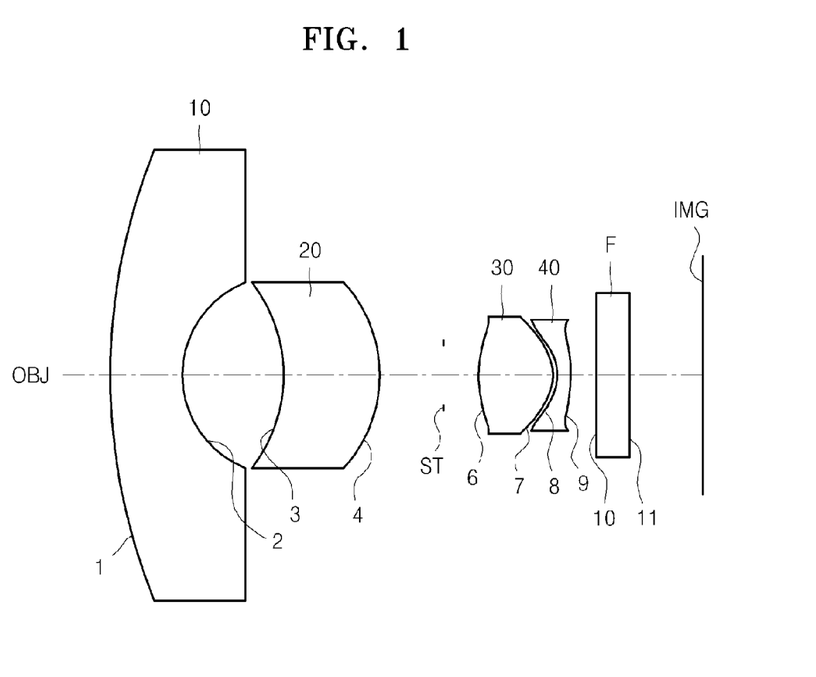
FIG. 1 is a cross-sectional view illustrating an optical arrangement of a photographic lens optical system according to a first embodiment of the present invention.
Figure 3:
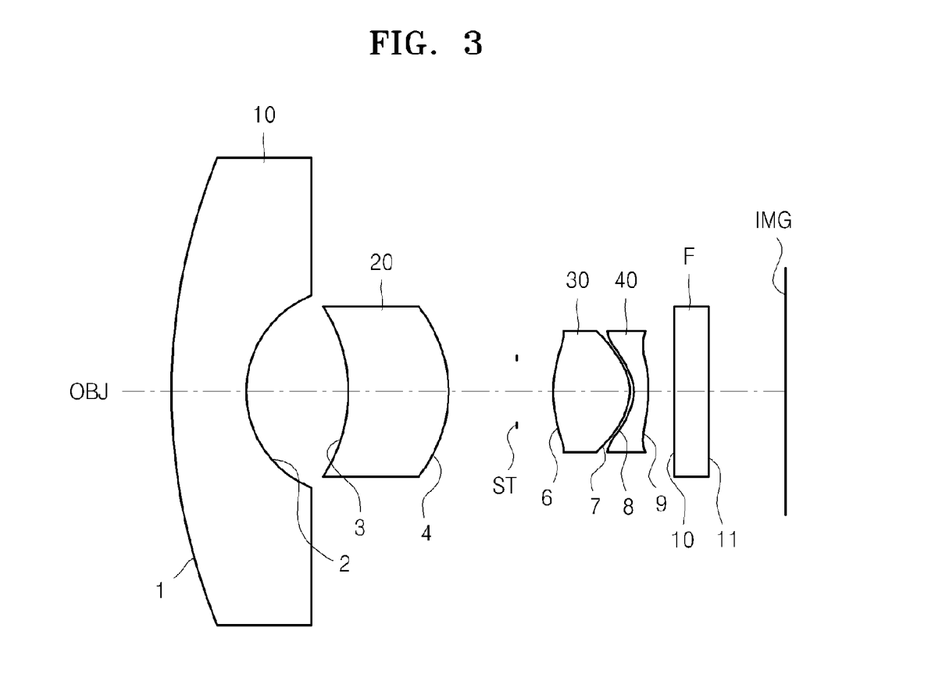
FIG. 3 is a cross-sectional view illustrating an optical arrangement of a photographic lens optical system according to a second embodiment of the present invention.
Figure 5:
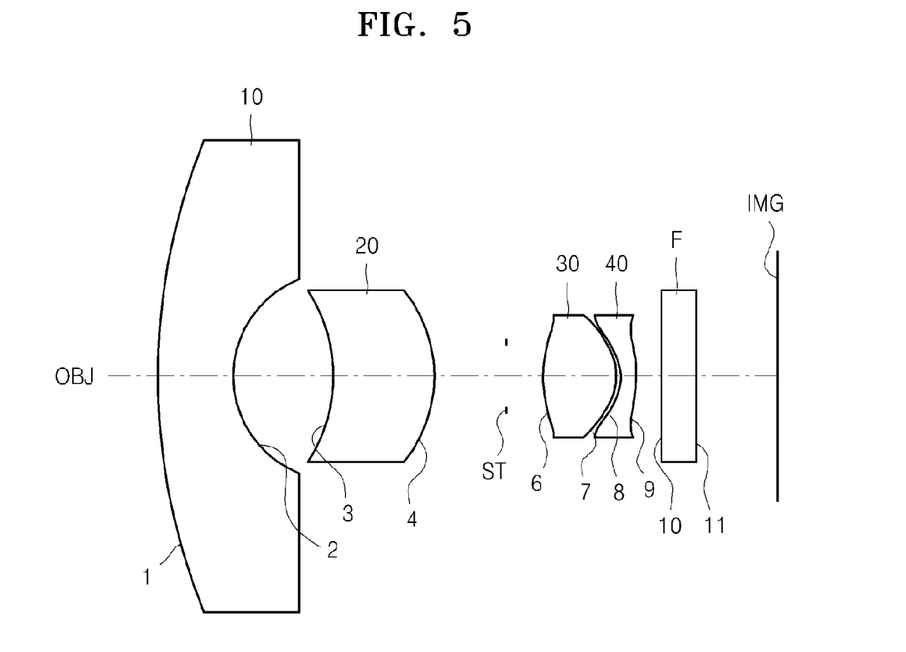
FIG. 5 is a cross-sectional view illustrating an optical arrangement of a photographic lens optical system according to a third embodiment of the present invention.

FIGS. 1, 3, and 5 illustrate optical arrangements of photographic lens optical systems according to first, second, and third embodiments of the present invention, respectively.

Referring to FIGS. 1, 3, and 5, each of the photographic lens optical systems of the embodiments of the present invention includes a first lens 10 having a negative refractive power, a second lens 20 having a positive refractive power, a third lens 30 having a positive refractive power, and a fourth lens 40 having a negative refractive power, which are sequentially arranged in a direction from an object side OBJ to an image side (surface) IMG.

The first lens 10 may be convex toward the object side OBJ. For example, the first lens 10 may have a meniscus shape convex toward the object side OBJ.

The second lens 20 may be convex toward the image side IMG. For example, the second lens 20 may have a meniscus shape convex toward the image side IMG. The second lens 20 may be an aspheric lens having at least one aspheric surface or may be a double aspheric lens.

The third lens 30 may be a double convex lens. The third lens 30 may be an aspheric lens having at least one aspheric surface or may be a double aspheric lens.

The fourth lens 40 may be convex toward the image side IMG. For example, the fourth lens 40 may have a meniscus shape convex toward the image side IMG. The fourth lens 40 may be an aspheric lens having at least one aspheric surface or may be a double aspheric lens.

An aperture stop ST may be disposed between the second lens 20 and the third lens 30. However, the position of the aperture stop ST is not limited thereto.

A filter member F may be disposed between the fourth lens 40 and the image surface IMG. The filter member F may be an infrared blocking filter. A cover glass may be additionally disposed together with the filter member F. Alternatively, an infrared blocking coating may be formed on an object-side surface of the first lens 10 selectively or together with the filter member F.

An image sensor (not shown) such as a charge coupled device (CCD) or a complementary metal oxide semiconductor (CMOS) may be disposed on the image surface IMG.

The lenses of the photographic lens optical systems of the embodiments are configured to satisfy demands for easy aberration correction, wide angle-of-view characteristics, and size reduction of cameras including the photographic lens optical systems.

Each of the photographic lens optical systems may satisfy the following condition 1:

$$0.15 < |(\tan \theta)/f| < 0.25 \quad (1)$$

where $\theta$ and f denote the angle of view and focal length of the photographic lens optical system, respectively.

For values of $(\tan \theta)/f$ higher than the upper limit of condition 1, the photographic lens optical system may not have a wide angle of view, and for values of $(\tan \theta)/f$ less than the lower limit of the condition 1, the photographic lens optical system may have a wide angle of view. However, it may be difficult to correct aberrations such as spherical aberration and coma aberration of the photographic lens optical system.

If the photographic lens optical system satisfies condition 1, the photographic lens optical system may have a very wide angle of view equal to or greater than about 160°, and aberrations of the photographic lens optical systems may be effectively corrected.

The photographic lens optical system may also satisfy the following condition 2:

$$1.3 < r2/f < 1.5 \quad (2)$$

where r2 denotes the radius of curvature of an image-side surface of the first lens 10, and f denotes the focal length of the photographic lens optical system.

Condition 2 regulates the ratio of the radius of curvature of the image-side surface of the first lens 10 to the focal length of the photographic lens optical system. According to condition 2, the radius of curvature of the image-side surface of the first lens 10 has a relatively small value.

The photographic lens optical system may also satisfy the following condition 3:

$$0.9 < d4/f < 1.0 \quad (3)$$

where d4 denotes the distance between an image-side surface of the second lens 20 and the aperture stop ST.

The first lens 10, the second lens 20, the third lens 30, and the fourth lens 40 may be formed of glass or a plastic material. In the latter case, the first lens 10, the second lens 20, the third lens 30, and the fourth lens 40 may be inexpensive and lightweight. At least one of the first lens 10, the second lens 20, the third lens 30, and the fourth lens 40 may be an aspheric lens having at least one aspheric surface for correcting aberrations. If the aspheric surface is formed of a plastic material, a manufacturing process may be easily performed. For example, the second lens 20, the third lens 30, and the fourth lens 40 may be double aspheric lenses. However, the embodiments of the present invention are not limited thereto.

Hereinafter, lens data will be described according to the embodiments of the present invention. Regarding the lens data, ST denotes an aperture stop, and "*" at the rear of the surface number of a surface indicates that the surface is aspheric. R, T, Nd, and Vd denote a radius of curvature, a thickness or interval, a refractive index, and an Abbe number, respectively. In addition, Fno denotes an F-number, f denotes a focal length, and $\theta$ denotes an angle of view. The focal lengths, radii of curvature, and thicknesses or intervals are expressed in millimeters (mm).

The aspheric surfaces are defined as follows.

$$Z = \frac{Y^2}{R(1 + \sqrt{1 - (1+K)Y^2/R^2})} + AY^4 + BY^6 + CY^8 + DY^{10} \quad \text{[Equation 1]}$$

where Z denotes a distance measured from the vertex of a lens in the direction of the optical axis of the lens, Y denotes a distance measured from the optical axis in a direction perpendicular to the optical axis, K denotes a conic constant, A, B, C, and D denote aspheric surface coefficients, and R denotes the radius of curvature at the vertex of the lens.

First Embodiment

FIG. 1 is a cross-sectional view illustrating the optical arrangement of the photographic lens optical system of the first embodiment. Lens data of the first embodiment are shown below.

TABLE 1

| Fno: 2.8, f: 1.4531 | | | | |
|---|---|---|---|---|
| Surfaces | R | T | Nd | Vd |
| OBJ | Infinity | Infinity | | |
| 1 | 12.5934 | 1.5 | 1.776 | 49.62 |
| 2 | 2.116 | 2.1048 | | |
| 3* | −3.1407 | 2 | 1.544 | 56.09 |
| 4* | −2.3789 | 1.3203 | | |
| ST | Infinity | 0.7142 | | |
| 6* | 2.5332 | 1.5555 | 1.544 | 56.09 |
| 7* | −0.9978 | 0.0876 | | |
| 8* | −0.8391 | 0.3 | 1.636 | 23.89 |
| 9* | −2.0876 | 0.5 | | |
| 10 | Infinity | 0.7 | | |
| 11 | Infinity | 1.5151 | | |
| IMG | Infinity | 0.0125 | | |

The following table shows aspheric surface coefficients.

TABLE 2

| Surfaces | K | A | B | C | D |
|---|---|---|---|---|---|
| 3 | 0 | −0.0067 | 0.0038 | −0.0016 | 0.0003 |
| 4 | 0.0505 | 0.0143 | −0.0007 | 0.0006 | 0 |
| 6 | −1.642 | 0.008 | −0.0013 | −0.0114 | −0.0076 |
| 7 | −0.7515 | 0.0464 | 0.0247 | −0.0028 | −0.004 |
| 8 | −1.6594 | −0.008 | 0.0289 | 0.0205 | −0.0063 |
| 9 | −8.3132 | 0.0298 | 0.019 | 0.0053 | 0.0021 |

Figure 2:
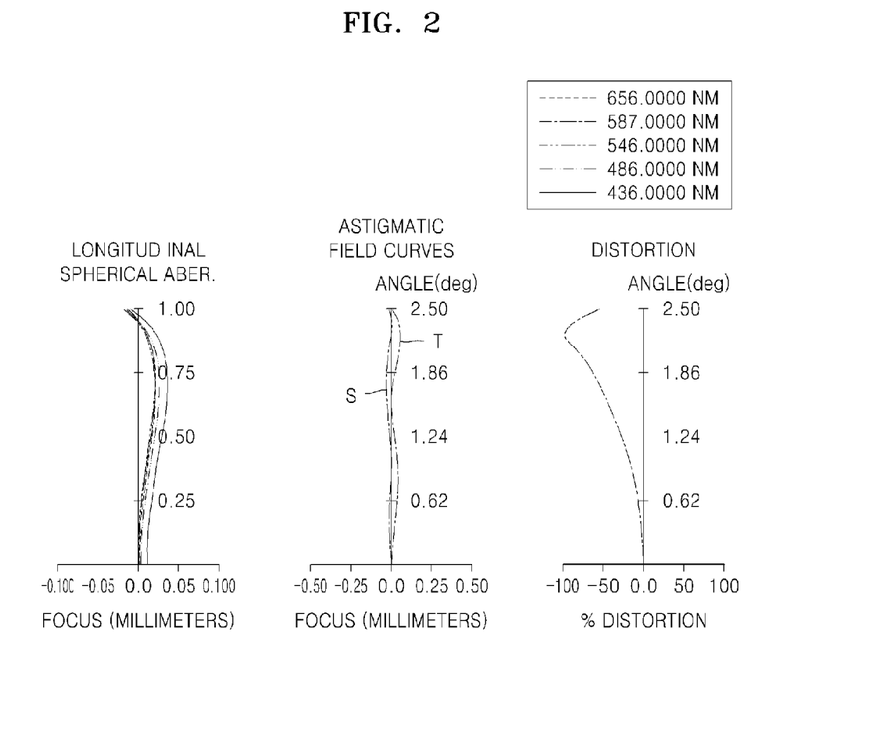
FIG. 2 illustrates a longitudinal spherical aberration, astigmatic field curves, and distortion of the photographic lens optical system of the first embodiment.

FIG. 2 illustrates a longitudinal spherical aberration, astigmatic field curves, and distortion of the photographic lens optical system of the first embodiment. In FIG. 2, the longitudinal spherical aberration is plotted with respect to light having wavelengths of 656.00 nm, 587.00 nm, 546.00 nm, 486.00 nm, and 436.00 nm, and astigmatic field curves and distortion are plotted with respect to light having a wavelength of 587.00 nm. In the astigmatic field curves, a sagittal field curvature and a tangential field curvature are denoted by S and T, respectively.

Second Embodiment

FIG. 3 is a cross-sectional view illustrating the optical arrangement of the photographic lens optical system of the second embodiment. Lens data of the second embodiment are shown below.

TABLE 3

Fno: 2.8, f: 1.4424

| Surfaces | R | T | Nd | Vd |
|---|---|---|---|---|
| OBJ | Infinity | Infinity | | |
| 1 | 12.3984 | 1.5 | 1.776 | 49.62 |
| 2 | 2.0492 | 2.0421 | | |
| 3* | −3.1731 | 2 | 1.544 | 56.09 |
| 4* | −2.3898 | 1.3794 | | |
| ST | Infinity | 0.7276 | | |
| 6* | 2.4725 | 1.5306 | 1.544 | 56.09 |
| 7* | −1.0043 | 0.0809 | | |
| 8* | −0.8714 | 0.3 | 1.636 | 23.89 |
| 9* | −2.2847 | 0.5 | | |
| 10 | Infinity | 0.7 | | |
| 11 | Infinity | 1.5346 | | |
| IMG | Infinity | 0.0148 | | |

The following table shows aspheric surface coefficients.

TABLE 4

Fno: 2.8, f: 1.4646

| Surfaces | K | A | B | C | D |
|---|---|---|---|---|---|
| 3 | 0 | −0.0062 | 0.0037 | −0.0016 | 0.0002 |
| 4 | 0.0418 | 0.0138 | −0.0008 | 0.0005 | 0 |
| 6 | −1.6601 | 0.0079 | −0.0009 | −0.0101 | −0.0074 |
| 7 | −0.7546 | 0.0474 | 0.0247 | −0.003 | −0.004 |
| 8 | −1.6536 | −0.0084 | 0.0289 | 0.0207 | −0.0062 |
| 9 | −9.2412 | 0.0299 | 0.0183 | 0.0051 | 0.0026 |

Figure 4:
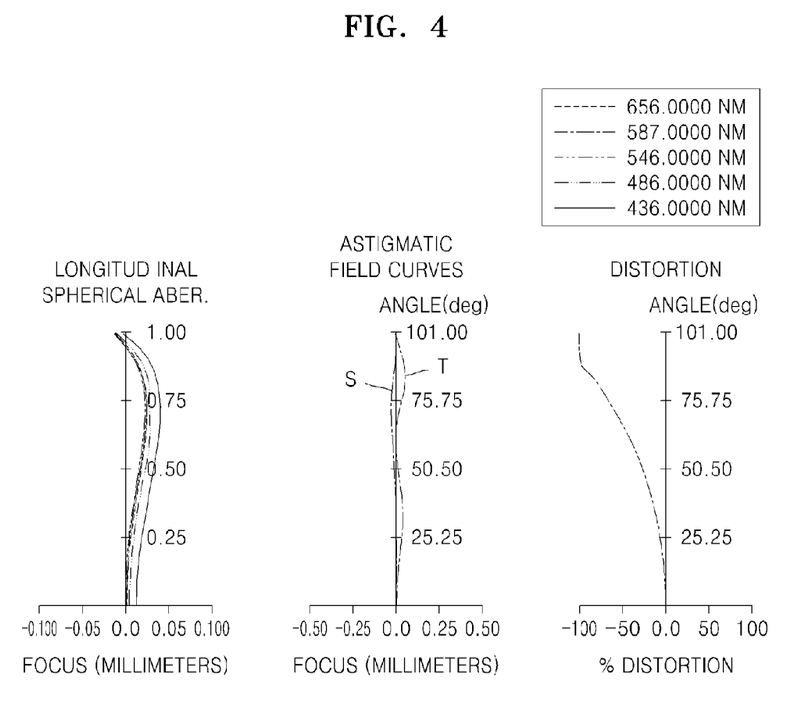
FIG. 4 illustrates a longitudinal spherical aberration, astigmatic field curves, and distortion of the photographic lens optical system of the second embodiment.

FIG. 4 illustrates a longitudinal spherical aberration, astigmatic field curves, and distortion of the photographic lens optical system of the second embodiment.

Third Embodiment

FIG. 5 is a cross-sectional view illustrating the optical arrangement of the photographic lens optical system of the third embodiment. Lens data of the third embodiment are shown below.

TABLE 5

| Surfaces | R | T | Nd | Vd |
|---|---|---|---|---|
| OBJ | Infinity | Infinity | | |
| 1 | 12.4093 | 1.5 | 1.776 | 49.62 |
| 2 | 2.0036 | 2.0295 | | |
| 3* | −3.1553 | 2 | 1.544 | 56.09 |
| 4* | −2.3669 | 1.376 | | |
| ST | Infinity | 0.7262 | | |
| 6* | 2.4136 | 1.4769 | 1.544 | 56.09 |
| 7* | −1.0349 | 0.0866 | | |
| 8* | −0.8844 | 0.3 | 1.636 | 23.89 |
| 9* | −2.4029 | 0.5 | | |
| 10 | Infinity | 0.7 | | |
| 11 | Infinity | 1.5983 | | |
| IMG | Infinity | 0.066 | | |

The following table shows aspheric surface coefficients.

TABLE 6

| Surfaces | K | A | B | C | D |
|---|---|---|---|---|---|
| 3 | 0 | −0.0072 | 0.0036 | −0.0016 | 0.0003 |
| 4 | 0.07 | 0.0143 | −0.0008 | 0.0005 | 0 |
| 6 | −1.4293 | 0.0095 | −0.0007 | −0.0105 | −0.0069 |
| 7 | −0.747 | 0.0454 | 0.0242 | −0.003 | −0.0041 |
| 8 | −1.6853 | −0.0067 | 0.0292 | 0.0206 | −0.0061 |
| 9 | −10.8236 | 0.032 | 0.0199 | 0.0058 | 0.0022 |

Figure 6:
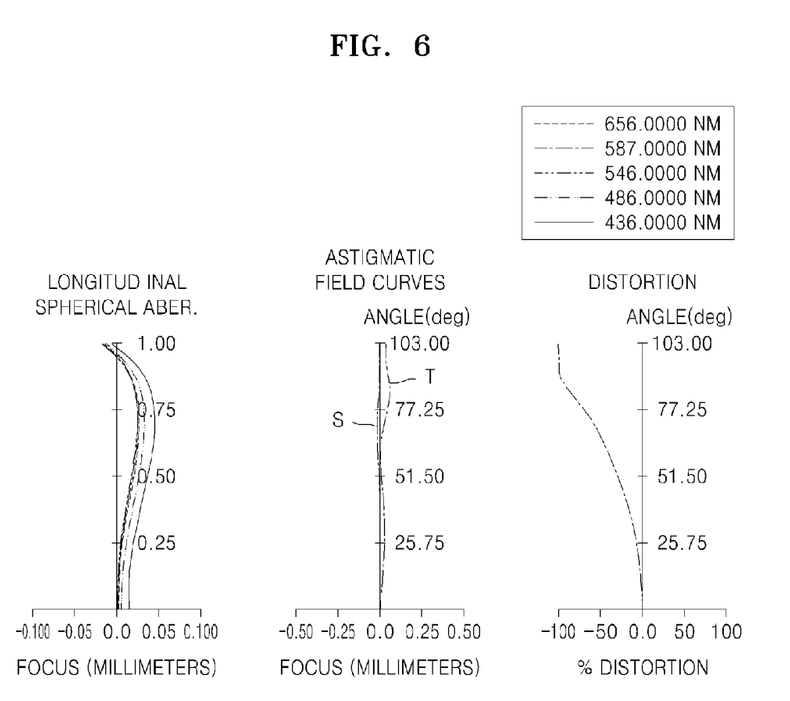
FIG. 6 illustrates a longitudinal spherical aberration, astigmatic field curves, and distortion of the photographic lens optical system of the third embodiment.

FIG. 6 illustrates a longitudinal spherical aberration, astigmatic field curves, and distortion of the photographic lens optical system of the third embodiment.

Table 7 below shows that the photographic lens optical systems of the first to third embodiments satisfy conditions 1, 2, and 3.

TABLE 7

| Conditions | First embodiment | Second embodiment | Third embodiment |
|---|---|---|---|
| $|\tan\theta|$ | 0.364 | 0.2867 | 0.364 |
| f | 1.4531 | 1.4424 | 1.4646 |
| Condition 1: $|(\tan\theta)/f|$ | 0.2505 | 0.1988 | 0.2485 |
| r2 | 2.116 | 2.0492 | 2.0036 |
| Condition 2: r2/f | 1.4562 | 1.4207 | 1.368 |
| d4 | 1.3203 | 1.3794 | 1.376 |
| Condition 3: d4/f | 0.9086 | 0.9563 | 0.9395 |

According to the embodiments, small and slim photographic lens optical systems having wide angles of view and high optical performance may be provided.

The photographic lens optical systems of the embodiments may be used in various photographing apparatuses together with image sensors converting optical images formed by the photographic lens optical systems into electric signals. Such photographing apparatuses may be used in various electronic devices or other devices such as portable terminals, door phones, and automobiles.

The photographic lens optical systems are constructed by using four lenses to be short, small, lightweight, and have a wide angle-of-view.

If the aspheric lenses of the photographic lens optical systems are formed of a plastic material, the photographic lens optical systems may be manufactured with low costs and allow the photographic lens optical systems to have high performance.

The photographic lens optical systems may be suitable for use in cameras of vehicles.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A photographic lens optical system comprising:
   a first lens having a negative refractive power and a meniscus shape convex toward an object side;
   a second lens having a positive refractive power and a shape convex toward an image side;
   a third lens having a positive refractive power and a double convex shape; and
   a fourth lens having a negative refractive power and a shape convex toward the image side,
   wherein the first to fourth lenses are sequentially arranged in a direction from the object side to the image side, and the photographic lens optical system satisfies the following condition:

$$0.15 < |(\tan \theta)/f| < 0.25$$

where θ and f denote an angle of view and a focal length of the photographic lens optical system, respectively.

2. The photographic lens optical system of claim 1, wherein the photographic lens optical system satisfies the following condition:

$$1.3 < r2/f < 1.5$$

where r2 denotes a radius of curvature of an image-side surface of the first lens, and f denotes a focal length of the photographic lens optical system.

3. The photographic lens optical system of claim 1, wherein at least one of the first lens, the second lens, the third lens, and the fourth lens has at least one aspheric surface.

4. The photographic lens optical system of claim 3, wherein the second lens, the third lens, and the fourth lens are double aspheric lenses.

5. The photographic lens optical system of claim 3, wherein at least one of the first lens, the second lens, the third lens, and the fourth lens is formed of a plastic material.

6. The photographic lens optical system of claim 5, wherein one or more of the first lens, the second lens, the third lens, and the fourth lens that have aspheric surfaces are formed of a plastic material.

7. The photographic lens optical system of claim 1, further comprising an aperture stop and satisfying the following condition:

$$0.9 < d4/f < 1.0$$

where d4 denotes a distance between an image-side surface of the second lens and the aperture stop.

8. The photographic lens optical system of claim 2, further comprising an aperture stop and satisfies the following condition:

$$0.9 < d4/f < 1.0$$

where d4 denotes a distance between an image-side surface of the second lens and the aperture stop.

9. The photographic lens optical system of claim 7, wherein the aperture stop is disposed between the second lens and the third lens.

10. The photographic lens optical system of claim 7, wherein at least one of the first lens, the second lens, the third lens, and the fourth lens has at least one aspheric surface.

11. The photographic lens optical system of claim 7, wherein at least one of the first lens, the second lens, the third lens, and the fourth lens is formed of a plastic material.

12. The photographic lens optical system of claim 11, wherein one or more of the first lens, the second lens, the third lens, and the fourth lens that have aspheric surfaces are formed of a plastic material.

13. A photographing apparatus comprising:
    the photographic lens optical system of claim 1; and
    an image sensor converting an optical image formed by the photographic lens optical system into an electric signal.

* * * * *